T. C. WURTS.
CONTROL SYSTEM.
APPLICATION FILED SEPT. 21, 1916.

1,317,254.

Patented Sept. 30, 1919.

WITNESSES:
Fred H. Miller
W. B. Wells

INVENTOR
Thomas C. Wurts
BY
Wesley G. Carr
ATTORNEY

UNITED STATES PATENT OFFICE.

THOMAS C. WURTS, OF PITTSBURGH, PENNSYLVANIA, ASSIGNOR TO WESTINGHOUSE ELECTRIC & MANUFACTURING COMPANY, A CORPORATION OF PENNSYLVANIA.

CONTROL SYSTEM.

1,317,254. Specification of Letters Patent. Patented Sept. 30, 1919.

Application filed September 21, 1916. Serial No. 121,410.

*To all whom it may concern:*

Be it known that I, THOMAS C. WURTS, a citizen of the United States, and a resident of Pittsburgh, in the county of Allegheny and State of Pennsylvania, have invented a new and useful Improvement in Control Systems, of which the following is a specification.

My invention relates to systems of control primarily intended for electrically propelled vehicles.

One object of my invention is to provide a system of the above indicated character that shall give an indication at each point on a car or train where the motors thereof may be controlled, of the current flowing through the various motors.

A further object of my invention is to provide a system of control that shall be provided with controllers for governing the operation thereof and a group of meters associated with each controller, which are governed by the controller to give an indication of the current flowing through the various motors of the system.

More specifically, my invention consists of a system of control for an electric vehicle or a train of electric vehicles, that is provided with a motor or a number of motors for each truck. The motors of each truck are connected together in a separate circuit and each motor circuit is joined to a separate pair of train-line conductors by means of a current transformer and a compensator. A number of controllers are provided for governing the operation of the motors of the system and associated with each controller is a group of ammeters which may be connected to the various pairs of train-line conductors. The ammeters are connected to the various pairs of train-line conductors through the controllers, so that the ammeters of a group will only give an indication of current flowing through the motors when the controller associated therewith is in an operative position.

In many electric locomotives now in service, a separate rheostat is provided in circuit with the motor of each truck, and in such locomotives it is desirable to know the value of the current flowing through the motors, in order that the load on the various motors may be regulated. By providing a locomotive with a meter constructed in accordance with my invention and having the indicating transformers positioned adjacent to the master controller, the motorman may readily tell the value of the current flowing through each of the driving motors and may regulate the load carried by the motors in accordance therewith.

Figure 1:
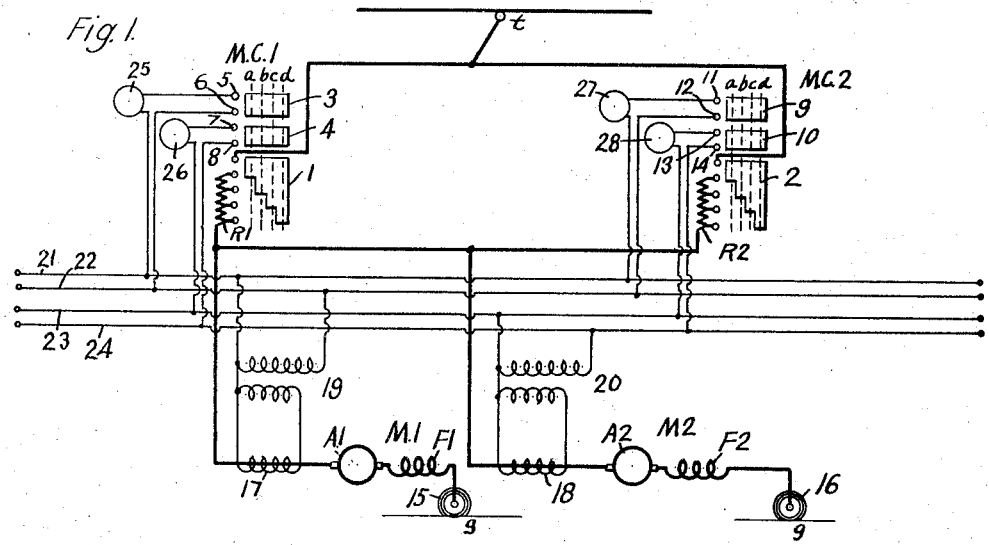
Figure 2:
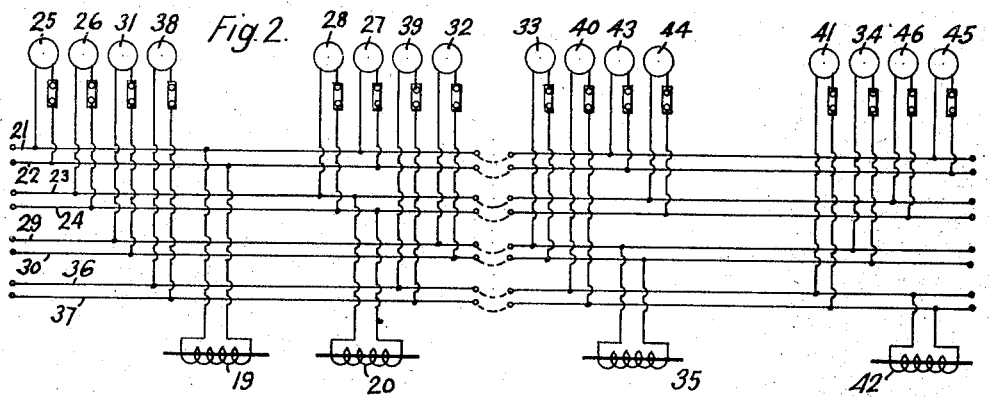
Figure 3:
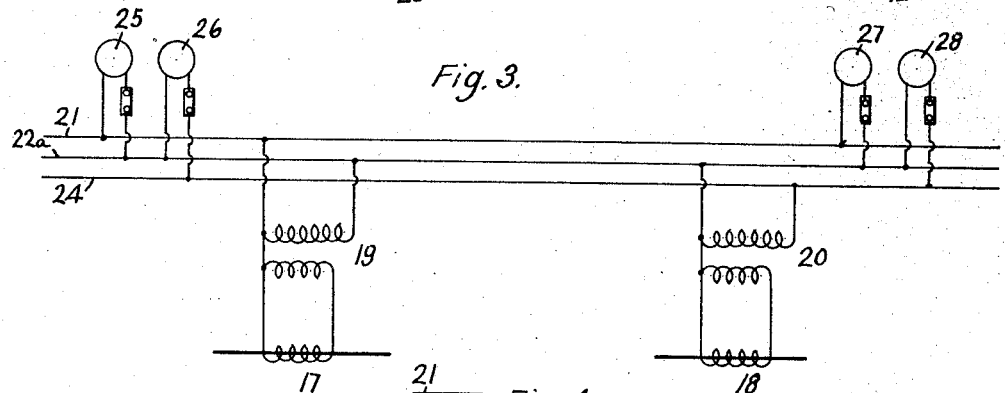
Figure 4:
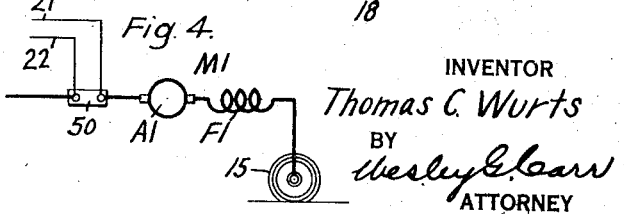

In the accompanying drawing, Figure 1 is a diagrammatic view of a system embodying my invention; Fig. 2 is a diagrammatic view of a system of control for a train of electric vehicles; and Figs. 3 and 4 are diagrammatic views of modifications of the system shown in Fig. 1.

Referring to Fig. 1 of the drawing, two motors M1 and M2 comprising armatures A1 and A2 and field windings F1 and F2 are adapted to be connected across a supply circuit comprising conductors $t$ and $g$. Two master controllers MC1 and MC2, respectively comprising movable contact segments 1 and 2 are adapted to be moved through positions $a$, $b$, $c$ and $d$ to connect the motors M1 and M2 across the supply conductors $t$ and $g$ and to exclude the resistors R1 and R2 from the motor circuits. The master controller MC1 is provided with two auxiliary contact segments or switches 3 and 4 which are adapted to engage contact fingers 5, 6, 7 and 8 when the master controller is in an operative position, and the master controller MC2 is provided with similar switches 9 and 10 which are adapted to engage contact fingers 11, 12, 13 and 14 when the master controller is in an operative position.

The motor M1 is mounted on one truck of the electric vehicle having a driving wheel 15 and the motor M2 is mounted on a second truck of the vehicle having a driving wheel 16.

A current transformer 17 is connected to the circuit of the motor M1 and a current transformer 18 is connected to the circuit of the motor M2 and two compensators 19 and 20 are adapted to connect the current transformers 17 and 18, respectively, to pairs of train-line conductors 21 and 22, and 23 and 24. Two ammeters 25 and 26 are disposed adjacent to the master controller MC1 and are connected across the pairs of train-line conductors by means of the auxiliary switches 3 and 4, when the master controller MC1 is in an operative position. Two ammeters 27 and 28 are disposed adjacent to the master controller MC2 and are connected across the pairs of train-line conductors 21 and 22, and 23 and 24, when the master controller MC2 is in an operative position.

In Fig. 2 of the drawing the ammeter connections for an additional electric vehicle having two trucks are illustrated. A pair of train-line conductors comprising conductors 29 and 30 is adapted to connect ammeters 31, 32, 33 and 34 to a compensator 35 that is associated with the motor circuit of the first truck of the second electric vehicle in a manner similar to that illustrated in Fig. 1 of the drawing. A second additional pair of train-line conductors comprising conductors 36 and 37 is adapted to connect ammeters 38, 39, 40 and 41 to a compensator 42 that is associated with the motor circuit of the second truck of the second vehicle in a manner similar to that illustrated in Fig. 1. Additional ammeters 43 and 44, and 45 and 46 are provided for giving an indication adjacent to the master controllers of the second vehicle of the current flowing through the motors of the first vehicle. In the system illustrated in Fig. 2 each master controller is provided with four auxiliary switches in place of two auxiliary switches as illustrated in Fig. 1 of the drawing.

In Fig. 3 of the drawing the two train-line conductors 22 and 23 are illustrated as combined in one single conductor 22a.

With the system illustrated in Fig. 1 in the position shown, the operation thereof, when either master controller is moved through its various operative positions, may be as follows: When the master controller MC1 is moved to position a, a circuit is completed through the motor M1, which may be traced from the supply conductor t, through the movable contact segment 1, resistor R1, current transformer 17, armature A1, field winding F1, and the wheel 15 of the first motor truck to the ground conductor g. A second circuit is also completed from the resistor R1, through the motor M2 to the ground g. The ammeters 25 and 26 are connected across the pairs of train-line conductors 21 and 22, and 23 and 24 by means of the auxiliary switches 3 and 4 engaging contact fingers 5 and 6 and 7 and 8. As the train-line conductors are connected to the circuits of the motor 1 and motor 2 by means of the compensators 19 and 20, and the current transformers 17 and 18, the ammeters 25 and 26 will give an indication of the current flowing through the motor circuits. When the master controller is moved successively through positions b, c and d, the resistor R1 is excluded from the circuit of the motors M1 and M2.

If the master controller MC2 is operated in place of MC1, then similar circuits are formed through the motors MC1 and MC2 but the ammeters 27 and 28 which are disposed adjacent to the master controller MC2 are connected across the train-line conductors 21 and 22 and 23 and 24 in place of the ammeters 25 and 26.

Considering the detailed description set forth of the ammeter circuits disclosed in Fig. 1 of the drawing, it is deemed unnecessary to trace the ammeter circuits of Fig. 2 in detail.

In case the motors be operated from a direct current source, ammeter shunts are employed in place of the series transformers and the compensators as a connecting means between the motor circuits and the ammeter train-line conductors. In Fig. 4 of the drawing an ammeter shunt 50 is illustrated as joining the circuit of motor M1 to the train-line conductors 21 and 22.

I do not wish to be restricted to the specific circuit connections or location and arrangement of parts herein set forth, as various modifications thereof may be effected without departing from the spirit and scope of my invention. I desire, therefore, that only such limitations shall be imposed as are indicated in the appended claims.

I claim as my invention:

1. In a system of control for an electric vehicle, the combination with a plurality of motors for operating the various motor trucks, and a current transformer and a compensator associated with the motor of each truck, of a plurality of meters, and means for selectively connecting certain meters to certain compensators.

2. In a system of control, the combination with a plurality of motor circuits, and controllers for governing the motor circuits, of a plurality of meters corresponding to said controllers and means embodied in said controllers for connecting the corresponding meters to the motor circuits.

3. In a system of control, the combination with a plurality of motor circuits, controllers for governing the motor circuits and a current transformer connected to each motor circuit, of a plurality of meters connected to each of said controllers, and auxiliary switches mounted on each of said controllers for connecting the meters associated therewith to the various current transformers.

4. In a system of control, the combination with a plurality of motor circuits, current transformers connected to the several motor circuits, and controllers for governing the motor circuits, of a group of ammeters disposed adjacent to each of said controllers, and auxiliary switches mounted on each controller for connecting the ammeters associated therewith to the corresponding current transformers when the controller is in an operative position.

5. In a system of control, the combination with a plurality of motor circuits, a plurality of train-line conductors, and a plurality of current transformers for connecting a pair of train-line conductors to each of said motor circuits, of a plurality of ammeters adapted to be connected to each pair of said train-line conductors and switching means for connecting one ammeter to each of said pairs of train-line conductors.

6. In a system of control, the combination with a plurality of motor circuits, a plurality of train-line conductors disposed in pairs, a current transformer connected to each of said motor circuits, and a plurality of compensators for connecting each of said current transformers to a pair of said train-line conductors, of a plurality of meters and switching means for connecting said meters in certain groups to the train-line conductors.

7. In a system of control for an electric vehicle, the combination with a plurality of motors, and controllers for governing the operation of the motors, of means associated with each controller and governed thereby for giving an indication of the current flowing through each of the motors.

8. In a system of control for an electric vehicle, the combination with a plurality of motors, and controllers for governing the operation of the motors, of a group of meters associated with each controller and governed thereby for giving an indication of the current flowing through the motors.

9. In a system of control, the combination with a plurality of train-line conductors disposed in pairs, and a plurality of meters, of means for connecting the meters in certain groups to the train-line conductors, each of said groups containing a meter adapted to be connected to each pair of train-line conductors.

10. In a system of control for an electric vehicle, the combination with a plurality of motors for propelling the vehicle, and controllers for governing the operation of the motors, of a group of meters associated with each of said controllers, each group of meters having an individual meter for reading the current flowing through each motor, and means for each controller to connect the group of meters associated therewith to read the current flowing through each of the motors.

In testimony whereof, I have hereunto subscribed my name this 7th day of Sept., 1916.

THOMAS C. WURTS.